United States Patent
Boling et al.

(10) Patent No.: US 7,251,471 B2
(45) Date of Patent: *Jul. 31, 2007

(54) EMERGENCY PHONE WITH SINGLE BUTTON ACTIVATION

(75) Inventors: Brian M. Boling, Knoxville, TN (US); Michael C. Bernstein, Knoxville, TN (US); Nicholas A. Natale, Knoxville, TN (US)

(73) Assignee: SecureAlert, Inc., Knoxville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/174,191

(22) Filed: Jun. 30, 2005

(65) Prior Publication Data

US 2006/0003809 A1    Jan. 5, 2006

Related U.S. Application Data (63) Continuation of application No. 09/684,831, filed on Oct. 10, 2000, now Pat. No. 7,092,695, which is a continuation-in-part of application No. 09/538,364, filed on Mar. 29, 2000, now Pat. No. 6,636,732, which is a continuation-in-part of application No. 09/495,080, filed on Jan. 31, 2000, now abandoned, which is a continuation of application No. 09/044,497, filed on Mar. 19, 1998, now Pat. No. 6,044,257.

(51) Int. Cl.
*H04M 11/04* (2006.01)

(52) U.S. Cl. ............... 455/404.2; 455/404.1; 455/521; 455/550.1; 379/37; 379/45; 340/539.12; 340/539.13

(58) Field of Classification Search ............... 455/90.1, 455/404.1, 456.1, 564, 521, 550.1, 46, 404.2, 455/414.1; 379/37, 40, 45, 38, 46; 340/988, 340/989, 425.5, 426.1, 539.13, 539.12, 825.36, 340/825.49; 342/357.01, 457

See application file for complete search history.

(56) References Cited

U.S. PATENT DOCUMENTS 4,446,454 A    5/1984    Pyle

(Continued)

*Primary Examiner*—William Trost
*Assistant Examiner*—James D Ewart
(74) *Attorney, Agent, or Firm*—Fulbright & Jaworski LLP (57) ABSTRACT

An emergency-use-only cellular phone provides for contacting and establishing full-duplex voice communication with emergency personnel at either a public emergency response service or a private roadside assistance service. The phone automatically places a cellular call to the public emergency response service with a single press of a first activation button, and to the private roadside assistance service with a single press of a second activation button. When either activation button is pressed, the following functions are initiated: (1) electrical power from a power supply is provided to a cellular transmitter and receiver, (2) the cellular receiver is activated to search for an available channel from among A or B cellular system channels, (3) an emergency telephone number corresponding to the selected service is accessed from memory, and (4) the cellular transmitter is activated to establish communication with the selected emergency response service. Since all of these functions are initiated by pressing one button, communication with the selected emergency response service may be established simply and speedily, even under stressful conditions. The phone may include a modular GPS receiver unit for providing location information to the public emergency response service or a private roadside assistance service.

19 Claims, 9 Drawing Sheets

U.S. PATENT DOCUMENTS

| | | | |
|---|---|---|---|
| 5,148,473 A | 9/1992 | Freeland et al. | |
| 5,203,009 A * | 4/1993 | Bogusz et al. | 455/565 |
| 5,235,320 A | 8/1993 | Romano | |
| 5,305,370 A * | 4/1994 | Kearns et al. | 379/45 |
| 5,334,974 A | 8/1994 | Simms et al. | |
| 5,365,570 A | 11/1994 | Boubelik | |
| 5,377,256 A | 12/1994 | Franklin et al. | |
| 5,388,147 A | 2/1995 | Grimes | |
| 5,465,388 A * | 11/1995 | Zicker | 455/404.1 |
| 5,475,751 A | 12/1995 | McMonagle et al. | |
| 5,479,482 A | 12/1995 | Grimes | |
| 5,542,100 A | 7/1996 | Hatakeyam | |
| 5,594,425 A | 1/1997 | Ladner et al. | |
| 5,687,215 A | 11/1997 | Timm et al. | |
| 5,694,452 A * | 12/1997 | Bertolet | 379/51 |
| 5,712,619 A | 1/1998 | Simkin | |
| 5,740,532 A | 4/1998 | Fernandez et al. | |
| 5,742,666 A | 4/1998 | Alpert | |
| 5,742,686 A | 4/1998 | Finley | |
| 5,742,904 A | 4/1998 | Pinder et al. | |
| 5,745,849 A | 4/1998 | Britton | |
| 5,748,089 A | 5/1998 | Sizemore | |
| 5,797,091 A | 8/1998 | Clise et al. | |
| 5,815,118 A | 9/1998 | Schipper | |
| 5,828,292 A | 10/1998 | Kokhan | |
| 5,873,040 A | 2/1999 | Dunn et al. | |
| 5,983,115 A | 11/1999 | Mizikovsky | |
| 5,991,637 A | 11/1999 | Mack, II et al. | |
| 5,995,847 A | 11/1999 | Gergen | |
| 6,014,555 A | 1/2000 | Tendler | |
| 6,025,779 A | 2/2000 | Huang | |
| 6,026,300 A | 2/2000 | Hicks | |
| 6,035,201 A | 3/2000 | Whitehead | |
| 6,035,217 A * | 3/2000 | Kravitz | 455/561 |
| 6,044,257 A | 3/2000 | Boling et al. | |
| 6,047,196 A | 4/2000 | Makela et al. | |
| 6,115,597 A * | 9/2000 | Kroll et al. | 455/404.1 |
| 6,198,914 B1 * | 3/2001 | Saegusa | 455/404.2 |
| 6,226,510 B1 | 5/2001 | Boling et al. | |
| 6,285,867 B1 | 9/2001 | Boling et al. | |
| 6,313,733 B1 * | 11/2001 | Kyte | 340/7.22 |
| 6,580,908 B1 * | 6/2003 | Kroll et al. | 455/435.1 |
| 6,636,732 B1 | 10/2003 | Boling et al. | |
| 6,675,006 B1 * | 1/2004 | Diaz et al. | 455/404.1 |
| 6,687,497 B1 * | 2/2004 | Parvulescu et al. | 455/420 |
| 6,765,991 B1 * | 7/2004 | Hanuschak et al. | 379/37 |
| 6,782,208 B1 * | 8/2004 | Lundholm et al. | 398/135 |
| 6,859,650 B1 * | 2/2005 | Ritter | 455/406 |
| 6,912,399 B2 * | 6/2005 | Zirul et al. | 455/463 |
| 2001/0051514 A1 * | 12/2001 | Lindholm | 455/404 |
| 4,591,661 A | 5/1986 | Benedetto et al. | |
| 4,965,548 A * | 10/1990 | Fayfield | 340/511 |
| 4,993,061 A | 2/1991 | Hsieh | |

* cited by examiner

EMERGENCY PHONE WITH SINGLE BUTTON ACTIVATION

PRIORITY

Priority is claimed as a continuation to U.S. patent application Ser. No. 09/684,831, filed Oct. 10, 2000 now U.S. Pat. No. 7,092,695, which is a continuation-in-part of U.S. patent application Ser. No. 09/538,364, filed Mar. 29, 2000, now U.S. Pat. No. 6,636,732, which is a continuation-in-part of U.S. patent application Ser. No. 09/495,080, filed Jan. 31, 2000, now abandoned, which is a continuation of U.S. patent application Ser. No. 09/044,497, filed Mar. 19, 1998, now U.S. Pat. No. 6,044,257. The disclosure of each aforementioned priority document is incorporated herein by reference.

BACKGROUND OF THE INVENTION

1. Field of the Invention

In general, the present invention relates to cellular telephones for use only in emergency situations. In particular, the present invention relates to a cellular telephone for calling a public emergency response center or an emergency roadside assistance service.

2. Background

In the past, conventional, full-service cellular telephones have been used in emergency situations to call for help from public emergency response services by dialing 911. Placing such a call with a conventional cellular telephone requires performing the following steps: (1) pressing a POWER button to power-on the phone, (2) dialing the individual numbers 9-1-1 on a keypad, and (3) pressing a SEND or CALL button. Such conventional phones may also be used to call for emergency roadside assistance from a private assistance service, such as the American Automobile Association (AAA), when a user has experienced a mechanical failure while driving an automobile. Placing a call to the private assistance service with a conventional cellular phone requires that the above three steps be performed, except that typically a 1-800 number for the private assistance service is dialed on the keypad instead of 9-1-1.

Although this conventional procedure to place a cellular phone call seems to be straightforward, it becomes much more difficult when it must be accomplished during a stressful emergency situation, such as immediately after an automobile accident or breakdown. During such situations, simplicity is critical. It is desirable that the user need not have to remember any phone numbers to dial, or which of many keys to press to initiate a call.

It is also desirable to have a cellular telephone that is designed for limited-use, such as in emergency situations only, thereby significantly reducing the cost of cellular service.

Therefore, a cellular telephone is needed that may be used to call for help in emergency situations, is simple and straightforward to operate, and that may be operated at a minimal service charge.

SUMMARY OF THE INVENTION

The present invention meets the above-listed needs, and eliminates the oversights, difficulties, and disadvantages of the prior art by providing an emergency cellular telephone for establishing communication with multiple emergency response services. The phone allows a user to choose between calling a public emergency response service, also referred to as a Public Safety and Action Point (PSAP) or 911 call center, in immediate emergency situations, and calling a private assistance service in situations where urgent services are desired, such as roadside assistance. The call to the public emergency response service is placed by pressing a single public emergency response button, which is protected from inadvertent activation by a protective cover. The call to the private assistance service is placed by pressing a single private assistance call button. Both call buttons require firm pressure thereupon for several seconds before activation is initiated, thereby preventing accidental activation.

Preferred embodiments of the phone include an audible siren that is activated by simultaneously pressing a pair of buttons, one located on either side of the phone housing, for approximately one second. The siren, by generating a 95 dB alarm signal, helps the user to draw the attention of passersby to an emergency situation or to discourage an attacker.

The phone is preferably powered by four standard AAA alkaline batteries, which typically provide over a year of service with no recharging. Thus, the phone may be stored away, such as in a glove compartment of an automobile, for long periods of time and will be available when needed in an emergency situation. An alternate rechargeable battery pack module may also be attached to the phone. In some embodiments, this module also includes a Global Positioning System (GPS) receiver that is used to provide position coordinates indicating the location of the caller to the private assistance service or public emergency response service.

According to the invention, the phone comprises a handheld housing having a cellular transmitter, a cellular receiver, and a power supply disposed therein. The cellular transmitter transmits only first and second outgoing cellular signals, where the first outgoing cellular signal is for establishing a first communication session with a first emergency response service and the second outgoing cellular signal is for establishing a second communication session with a second emergency response service. The cellular receiver receives only first and second incoming cellular signals, where the first incoming cellular signal is received from the first emergency response service during the first communication session, and the second incoming cellular signal is received from the second emergency response service during the second communication session.

Attached to the housing is a first activation button that, if pressed a first time when the telephone is in an off mode, causes the automatic initiation of several functions. Pressing the first activation button (1) causes electrical power from the power supply to be provided to the cellular transmitter and receiver, (2) initiates activation of the cellular receiver to search for an available cellular system channel, and (3) initiates activation of the cellular transmitter to transmit the first outgoing cellular signal to establish communication with the first emergency response service. Implementing a single activation button to initiate all of these functions simplifies communication with the first emergency response service in a stressful situation.

Also attached to the housing is a second activation button that, if pressed a first time when the telephone is in the off mode, causes (1) the electrical power from the power supply to be provided to the cellular transmitter and receiver, (2) initiates activation of the cellular receiver to search for an available cellular system channel, and (3) initiates activation of the cellular transmitter to transmit the second outgoing cellular signal to establish communication with the second emergency response service. Thus, communication with the second emergency response service is also simplified in a stressful situation.

The cellular transmitter is operable to transmit the first outgoing cellular signal to establish the first communication session regardless of whether the transmitter had last established a first communication session or a second communication session. Further, the cellular transmitter is operable to transmit the second outgoing cellular signal to establish the second communication session regardless of whether the transmitter had last established a first communication session or a second communication session. Thus, the operation of the phone is not limited to any particular sequence of placing calls to the public emergency response service and the private assistance service, thereby offering greater flexibility than has previously been available.

BRIEF DESCRIPTION OF THE DRAWINGS

Other objects, features and advantages of the present invention will become apparent by reference to the following detailed description when considered in conjunction with the accompanying drawings, in which like reference characters refer to like parts throughout the views, and wherein.

DETAILED DESCRIPTION OF THE PREFERRED EMBODIMENTS

Referring generally to FIGS. 1-5, a preferred embodiment of an emergency cellular telephone 10 for summoning help in an emergency is shown. The internal components of the phone 10 are contained within a rigid housing 12. The rigid housing 12 is preferably constructed of a durable material, such as polycarbonate, that will withstand being continuously carried in an individuals pocket or purse. Preferably, a protective cover 14 is movably attached at one edge to the rigid housing 12 by a pair of hinges 16. At the opposite edge of the cover 14 is a latch tab 18a that engages a latch pin 18b on the housing when the cover 14 is in the closed position.

Preferably, the cover 14 may be opened by applying a gentle pulling force to the cover 14 to disengage the latch pin 18b from the latch tab 18a.

Figure 1:
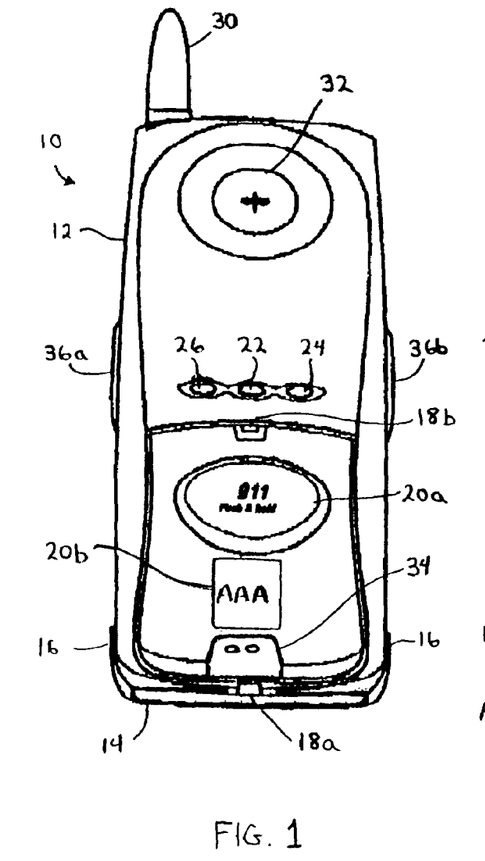
FIG. 1 depicts a top view of the emergency phone with a protective cover in an open position according to a preferred embodiment of the invention.
Figures 3, 4:
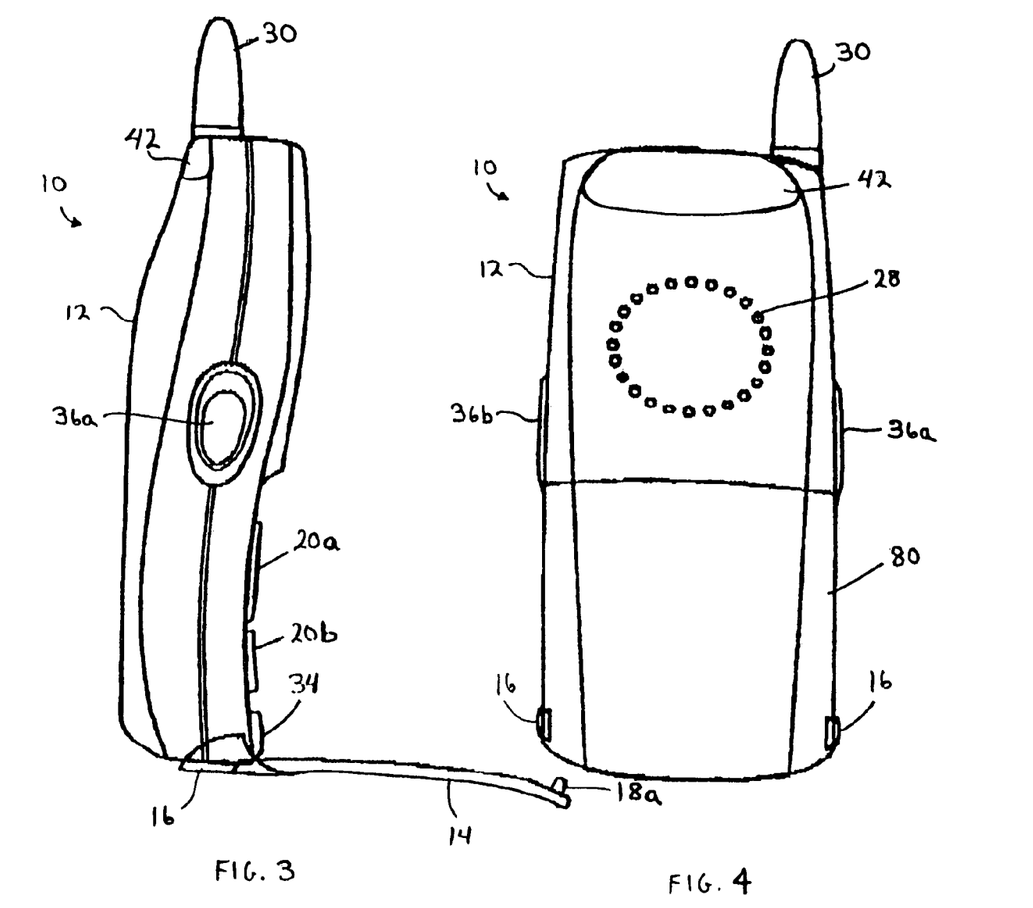
FIG. 3 depicts a side view of the emergency phone with the protective cover in the open position according to a preferred embodiment of the invention.
FIG. 4 depicts a bottom view of the emergency phone according to a preferred embodiment of the invention.

When the cover 14 is opened, as depicted in FIGS. 1 and 3, two large activation buttons 20a and 20b, are revealed. The button 20a is referred to herein as a first activation button or a 911 button. This first activation button 20a is used to activate the phone 10 to establish communication with a public emergency response service. The button 20b is referred to herein as the second activation button or the AAA button. The second activation button 20b is used to activate the phone 10 to establish communication with a private roadside assistance service, such as the AAA. Depending on the given situation, a user simply opens the cover 14 and presses the button 20a or 20b to summon help in an emergency situation. As described in more detail below, when either button 20a or 20b is pressed, the phone 10 powers up and begins to establish cellular communication with the requested service.

In an alternative embodiment of the invention, the second activation button 20b is located on a side of the housing 12, such as in the position of the alarm button 36b. Thus, it should be appreciated that the invention is not limited to any particular position of the buttons 20a and 20b on the phone 10.

In the preferred embodiment, the 911 button 20a and the AAA button 20b are the only control buttons on the phone 10 that are disposed beneath the cover 14. Thus, when closed, the cover 14 prevents accidental pressing of the buttons 20a or 20b which could inadvertently place a call to the public emergency response service or the private assistance service. Preferably, other functions provided by the phone 10, as described hereinafter, may be activated when the cover 14 is closed.

Figure 2:
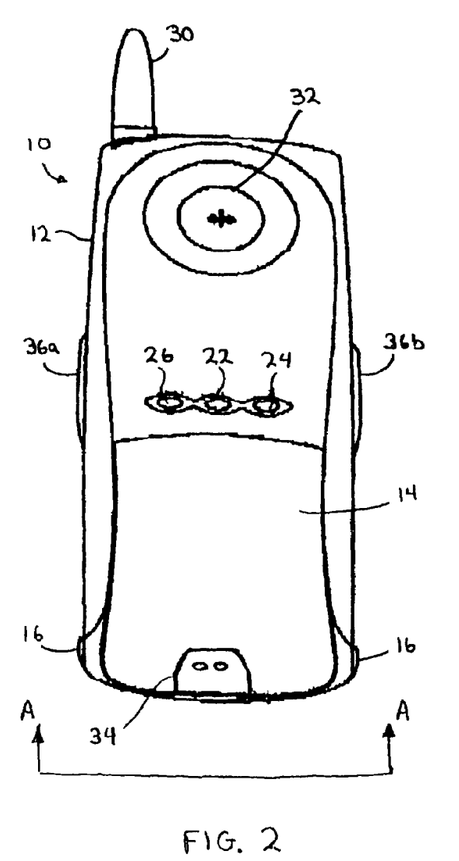
FIG. 2 depicts a top view of the emergency phone with the protective cover in a closed position according to a preferred embodiment of the invention.

As shown in FIGS. 1 and 2, the preferred embodiment of the phone 10 includes three indicator lights 22, 24, and 26. The centermost of the three lights is a low signal indicator light 22, which is preferably a red LED. On the right is a high signal indicator light 24, which is preferably a green LED, and on the left is an in-use indicator light 26, which is preferably a yellow LED. The particular circumstances in which each of these lights is illuminated is described in more detail hereinafter.

As shown in FIGS. 1-4, a low-profile radio-frequency antenna 30 is attached to the housing 12 for transmitting and receiving cellular signals.

A speaker port 32 and a microphone port 34 are also provided in the housing 12. Preferably, as shown in FIGS. 1-4, the microphone port 34 is uncovered and accessible when the cover 14 is in the open position (FIGS. 1 and 3) and in the closed position (FIG. 2). This feature allows the user to maintain a conversation with emergency response service personnel, even with the cover 14 closed. It may be advantageous in many circumstances to close the cover 14 after pressing the 911 button 20a or the AAA button 20b, thereby preventing accidental pressing of either button 20a or 20b while a call is in progress. As discussed in more detail hereinafter, pressing either of the buttons 20a or 20b while a call is in progress could terminate the call. Therefore, closing the cover 14 after initiating the call helps to avoid premature termination.

A preferred embodiment of the phone 10 includes an audible alarm or siren that alerts individuals in the immediate area that an emergency exists. Preferably, the audible alarm is activated by simultaneously pressing two alarm buttons 36a and 36b located on either side of the housing 12.

When the buttons 36a and 36b are pressed, an alarm type noise is emitted from an alarm port 28 in the housing 12. The number of different sounds that could be produced is limitless but the sound produced is preferably similar to that produced by a car alarm. In the preferred embodiment, the audible alarm is deactivated by simultaneously pressing the alarm buttons 36a and 36b again.

In order to minimize the cost of the cellular service needed to support it, the emergency phone 10 is strictly limited to emergency use only. Governmental regulations currently prohibit cellular service providers from refusing calls to 911 emergency response centers, even if the caller does not subscribe to a cellular service. Thus, the user may place 911 emergency calls using the phone 10 without having previously contracted for cellular service. As discussed in more detail below, the cost of cellular service for placing calls only to a single telephone number of a private assistance service, such as AAA, may be purchased at a rate far less than is typically paid for conventional cellular service. Further, this cost may be included in a membership fee that the user pays to the private organization that provides the roadside assistance, such as AAA.

Another one of the primary benefits of limiting use of the phone 10 to contacting only a public or a private emergency response service using one of two activation buttons 20a and 20b is the resulting simplicity of operation. As shown in FIG. 1, the activation buttons 20a and 20b are relatively large in relation to the size of the housing 12. Thus, the buttons 20a and 20b are easy to locate during a stressful emergency situation. Since only one button 20a or 20b need be pressed to initiate a call, even very young children or persons with an aversion to most electronic devices can be taught how to use the phone 10 to easily summon help in an emergency. Further, the time required to summon the emergency personnel is held to an absolute minimum. Almost as soon as the activation button 20a or 20b is pressed, the user has a verbal communications link to the public or private assistance service.

Figure 5:
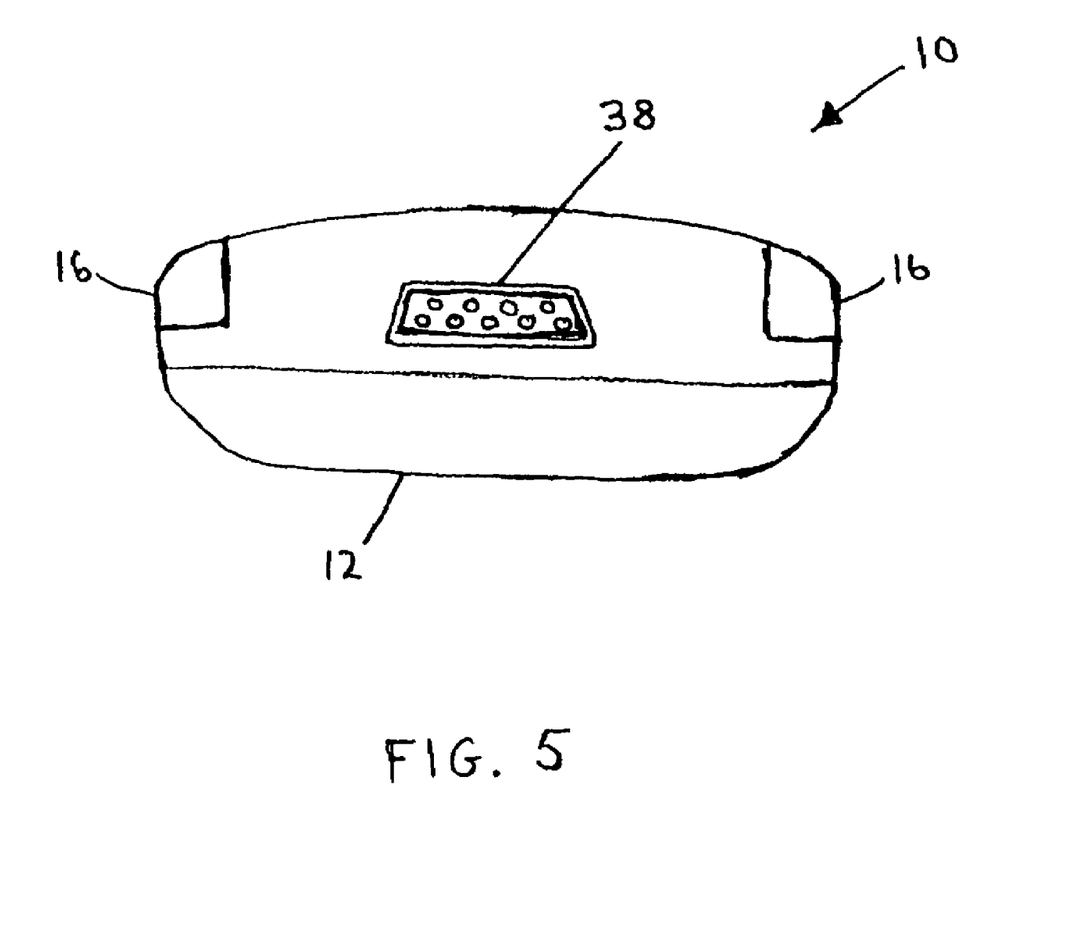
FIG. 5 depicts a narrow side view of the emergency phone with the protective cover in the closed position according to a preferred embodiment of the invention.

FIG. 5 depicts a preferred embodiment of the emergency phone 10 as viewed from the direction indicated by the arrows A-A in FIG. 2. As shown in FIG. 5, the phone 10 includes an interface port 38 which is accessible from outside the housing 12. As described in more detail below, the interface port 38 provides a programming and data transfer interface to allow modifications to the programming of the phone 10.

In addition to establishing cellular contact with an emergency response service, the emergency phone 10 may be configured to activate the home security system of the user. Because the radio communications range of the emergency phone 10 is limited, the emergency phone 10 can only contact the user's home security system when the emergency phone 10 is close to the home security system. Preferably, the radio communications range of the emergency phone 10 extends to at least 500 feet from the home security system. The home security system can react to the emergency phone's signal in a number of ways. In the preferred embodiment, the home security system turns the lights of the residence on and off and activates any audible alarms that the home security system uses. Turning on and off the house's lights and sounding the home security system's audible alarms can be beneficial for a number of reasons. First, the home security system alarm will only be activated if the emergency phone 10 is used when it is near the home. Thus, if the emergency situation involves an intruder or attacker, turning on the lights and sounding the alarms may scare the individual away. Secondly, turning on the lights and sounding the alarms will alert any individuals in or around the house that an emergency situation exists in or near the house. In addition, any of the variety of other functions typically performed by a home security system can be triggered by the signal from the emergency phone 10.

An embodiment of the emergency phone 10 is also provided that contacts the car alarm of the user. In a manner similar to that described for contacting the home security system of the user, the emergency phone 10 transmits a signal that activates the car alarm. The emergency phone 10 will only be able to signal the car alarm if the user is near the car when the emergency phone 10 is activated. Thus, the car alarm will help draw attention to the area in which the emergency situation exists. This could be especially beneficial if the emergency situation arose in a parking lot. Furthermore, if the car was just stolen, setting off the car alarm will draw attention to the thief and the stolen car.

One embodiment of the phone 10 includes a visual alarm button 40 that activates a flashing light 42 mounted on the housing 12. The flashing light 42 and the noise alarm serve similar functions. On the one hand they serve to scare off attackers, on the other hand they serve to draw attention to the individual requesting emergency assistance. Because the emergency phone 10 can be activated from anywhere that cellular service is available, the exact location of the caller may be unknown to the emergency response personnel. Thus, by drawing attention to the emergency phone 10 and its operator, the flashing light 42 and the audible alarm may be very helpful to emergency response personnel attempting to locate the individual who summoned them.

As mentioned above, a preferred embodiment of the invention includes a locator function. The locator function provides the public or private emergency response service the location of the emergency phone 10 at the time it was activated. The locator function is implemented in a variety of manners in different embodiments of the present invention. One embodiment involves the use of a GPS receiver. A GPS receiver utilizes signals from satellites orbiting the earth to determine the position of the receiver. When the first or second activation button 20a or 20b is pressed, the GPS receiver is activated to determine the location of the phone 10. The phone 10 then automatically transmits this positional information to the emergency response service. Another embodiment of the present invention uses a cellular location system to determine the position of the emergency phone 10, such as by triangulation. This cellular location system uses the strength and/or the relative phase of a signal from the phone 10 received at different cellular stations to determine the location of the phone 10. Positional information is extremely beneficial in an emergency situation because it allows the emergency response service to determine the location of the caller without requiring any input from the caller.

Figure 6:
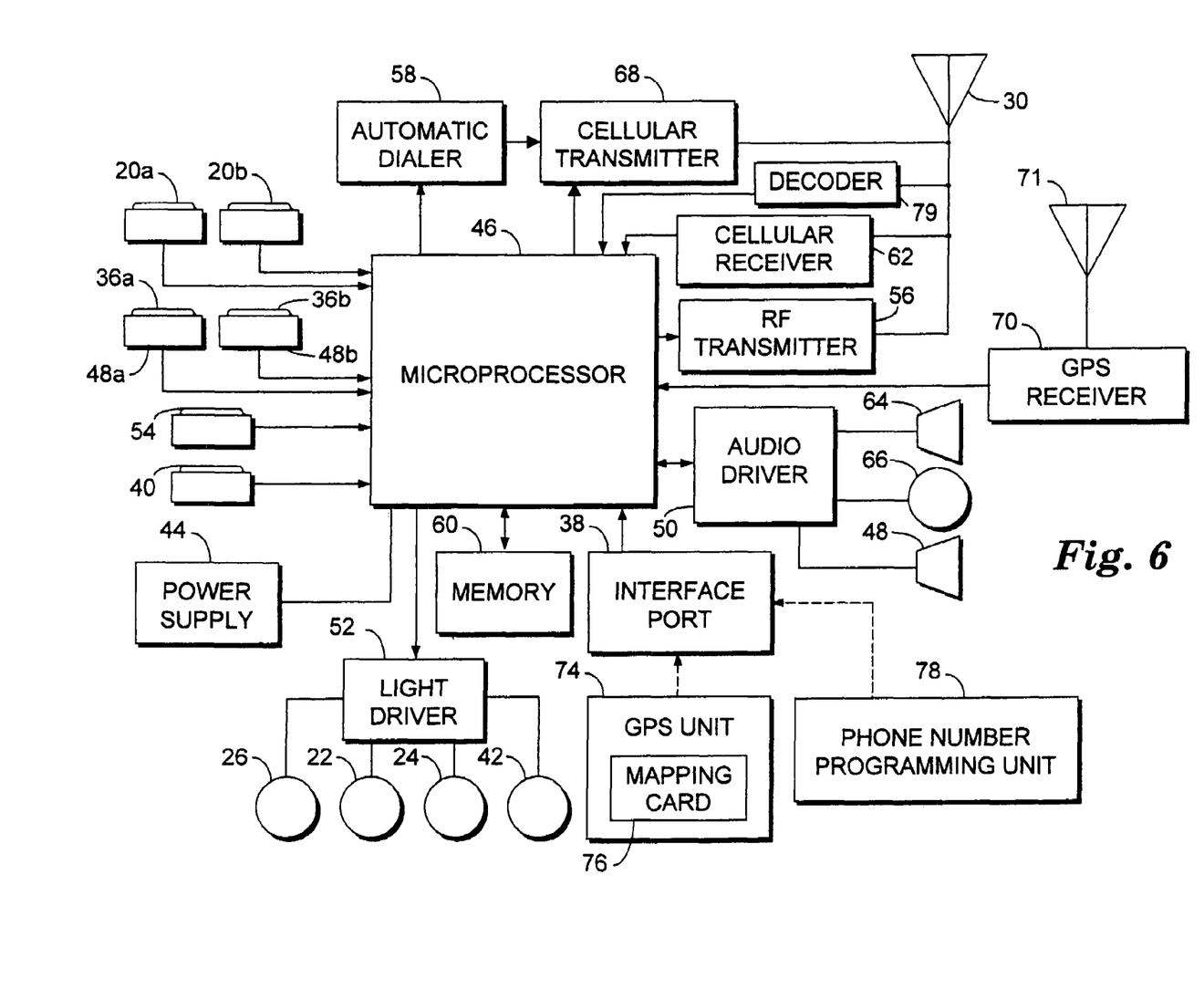
FIG. 6 is a functional block diagram of the emergency phone according to a preferred embodiment of the invention.

Referring now to FIG. 6, a block diagram of the electrical components of a preferred embodiment of the emergency phone 10 is shown. Power for the electrical components of the emergency phone 10 is supplied by a power supply 44. In the preferred embodiment, the power supply 44 is a DC power supply consisting of four replaceable AAA alkaline batteries. Alkaline batteries are preferred because they will allow a minimum continuous talk time of at least 30 minutes, are relatively inexpensive, are easily replaceable, and have a relatively long shelf-life between uses. Although lithium and nickel-cadmium batteries are typically the batteries of choice for conventional cellular phones, such batteries require constant recharging to maintain a useable voltage level. Such batteries are not preferred for use as the power supply 44 for the emergency phone 10 because they cannot maintain a charge during long periods of nonuse. Since the emergency phone 10 may be stored away, such as in an automobile glove compartment, for long periods between uses, long-life alkaline batteries are used in the preferred embodiment of the invention.

As described in more detail below, the GPS location function of the phone 10 may be provided by an add-on GPS receiver module. In that embodiment, the GPS module preferably includes a lithium or nickel-cadmium battery pack to provide adequate power for the phone components within the housing 12 and for the components of the GPS module.

As described above, the preferred embodiment of the invention has five user input buttons 36*a*, 36*b*, 20*a*, 20*b*, and 54. While these user inputs 36*a*, 36*b*, 20*a*, 20*b*, and 54 are shown and discussed as push-buttons, it is understood that the inputs 36*a*, 36*b*, 20*a*, 20*b*, and 54 may operate switches, touch sensors, or other similar devices.

With reference to FIG. 6, a microprocessor 46 monitors the state of a pair of alarm switches 27*a* and 27*b* which change state when the user presses the alarm buttons 36*a* and 36*b*. When the microprocessor 46 detects that the alarm switches 27*a-b* have changed state at the same time, the microprocessor 46 activates the audible alarm 48. As mentioned above, when activated, the audible alarm 48 generates a siren-like audio alarm signal. Preferably, the audible alarm 48 is driven by an audio driver circuit 50.

As described above, some embodiments include a flashing light 42. Preferably, the flashing light 42 is activated by a light driver circuit 52 in response to the audible alarm buttons 36*a* and 36*b* or the activation button 20*a* being pressed. The flashing light 42 helps to alert individuals in the immediate area that an emergency situation exists. In addition, once emergency response personnel have been summoned, the flashing light 42 can help the emergency personnel locate the emergency phone 10 and, thus, the individual who summoned the assistance.

A home security alarm button 54 is also provided. When the home alarm button 54 is pressed, a home alarm signal is sent to the microprocessor 46. In response to the home alarm signal, the microprocessor 46 produces an activation signal which is sent to a radio frequency transmitter 56. The radio frequency transmitter 56 conditions the activation signal and broadcasts it on the antenna 30. The preferred radio frequency transmitter 56 operates at about 310 MHz. The home security system detects the transmitted activation signal and responds accordingly. As discussed in greater detail above, the response preferably at least includes turning on and off the exterior lights of the house and producing an audible alarm.

In one embodiment, when either of the activation buttons 20*a* and 20*b* are pressed, the microprocessor 46 activates an automatic dialer 58, and the automatic dialer 58 dials the telephone number of the selected emergency response service. The telephone numbers.; may be stored in the automatic dialer 58 itself. In an alternate embodiment, the memory 60 is provided for storing the telephone numbers.

A cellular receiver 62 receives an incoming cellular signal from the public or private emergency response service and conditions the incoming signal to produce an incoming voice signal. The cellular receiver 62 may provide the voice signal to a speaker 64 directly or through the microprocessor 46 and the audio driver circuit 50, as shown in FIG. 6.

The operator of the emergency phone 10 can respond to the incoming signal from the emergency response services by speaking into the microphone 66. The microphone 66 converts the operator's speech into an outgoing voice signal that is conditioned by the audio driver circuit 50 and received by the microprocessor 46. The microprocessor 46 then sends the outgoing voice signal to a cellular transmitter 68, which generates an outgoing cellular signal based thereon. In an alternate embodiment, the outgoing voice signal is sent directly from the microphone 66 to the cellular transmitter 68.

The emergency phone 10 is designed to use the cellular communications technology that provides the most comprehensive coverage possible. Using the cellular technology that provides the largest possible coverage area is desirable because it minimizes the likelihood that the operator of the emergency phone 10 will be out of cellular communications range when an emergency situations arises. While the coverage range of digital cellular service providers is constantly increasing, the largest amount of cellular coverage is still provided by service providers using analog modulation technology. Thus, in the preferred embodiment, the cellular receiver 62 and cellular transmitter 68 use analog modulation technology. Furthermore, because the amount of time actually spent communicating with the emergency phone 10 will likely be very low, the cellular receiver 62 and transmitter 68 components are designed for maximum range and minimal talk times.

In another alternative embodiment, the emergency phone 10 is designed to scan for a digital cellular provider. If a digital cellular service provider is located, the emergency phone 10 will establish digital communications with the digital service provider. If no digital service provider is located, the emergency phone 10 then attempts to establish analog cellular communications with an analog service provider.

In the embodiment of FIG. 6, when the first or second activation button 20*a* or 20*b* is pressed, the microprocessor 46 prompts a GPS receiver 70 coupled to a GPS antenna 71 to determine the location of the emergency phone 10. Once the GPS receiver 70 has determined the coordinates of the emergency phone 10, the GPS receiver 70 provides the coordinates to the microprocessor 46. The microprocessor 46 then sends the location coordinates and the cellular system identification (SID) number of the phone 10 to the cellular transmitter 68, such as in the form of a digital string. The cellular transmitter 68 sends the location coordinates and the SID to the emergency response service by way of a cellular telephone network. The location coordinates allow the emergency response service to dispatch emergency personnel to the location from which the call was placed without even questioning the caller. Transmission of the SID allows the private assistance service or the public response service to determine the identity of the owner of the phone 10.

As shown in FIG. 6, the preferred embodiment of the invention includes a decoder chip 79 for decoding a prompt or queue signal transmitted from the private assistance service or the public emergency response service when a call has been established. The decoded prompt is provided to the microprocessor 46 which, in response to the prompt, sends the location coordinates and the SID to the cellular transmitter 68 for transmission to the connected service. In this way, the private assistance service or the public emergency response service has this information available even before voice communication is established with the caller.

The microprocessor 46 is also coupled to the light driver circuit 52 for controlling activation of the low signal indicator light 22, the high signal indicator light 24, and the in-use indicator light 26. The particular circumstances in which the microprocessor 46 causes activation of each of these lights is described in more detail hereinafter.

Figure 7A:
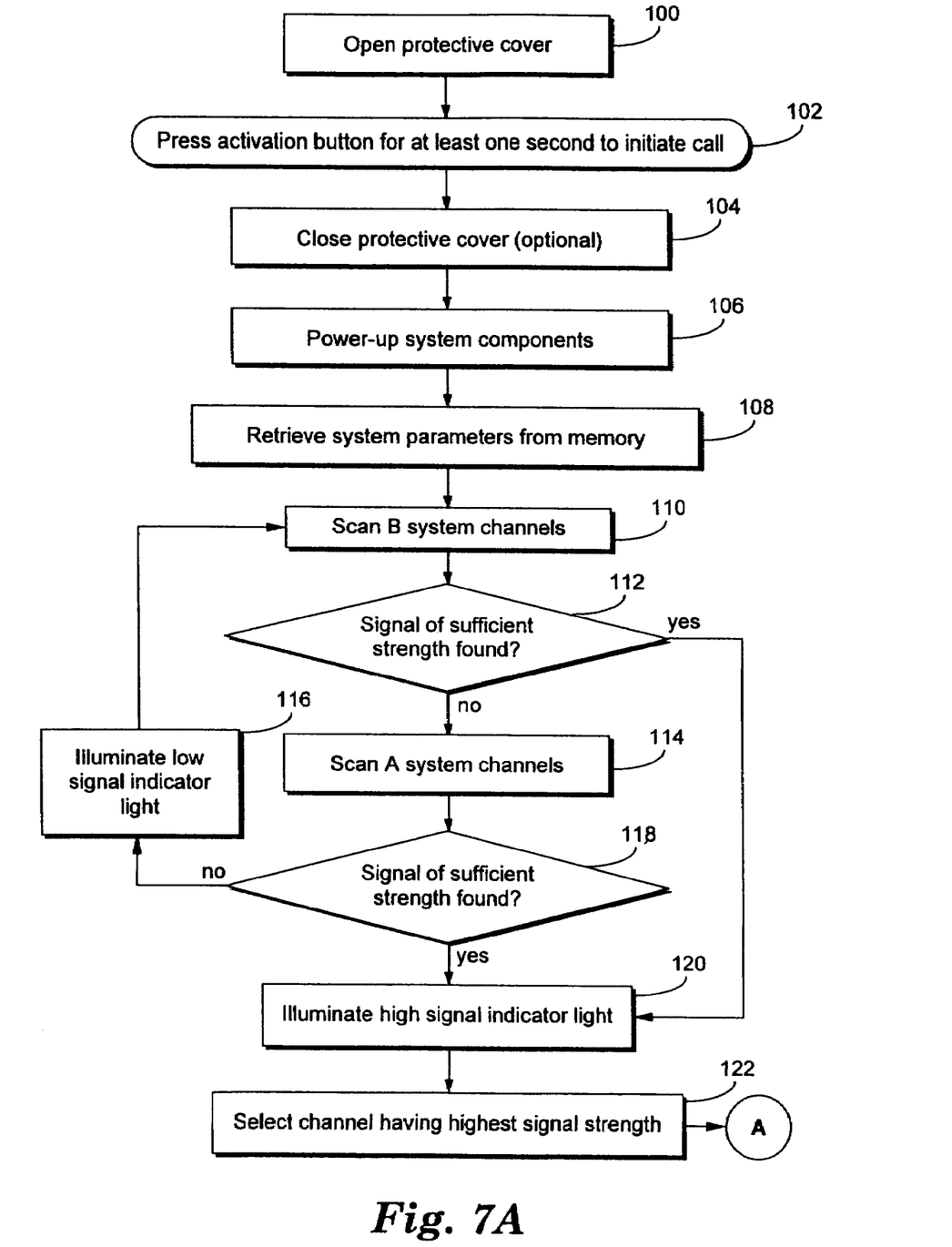
FIGS. 7A-C depict a functional flow diagram of a process for establishing an emergency cellular communication with an emergency response service according to a preferred embodiment of the invention.
Figure 7B:
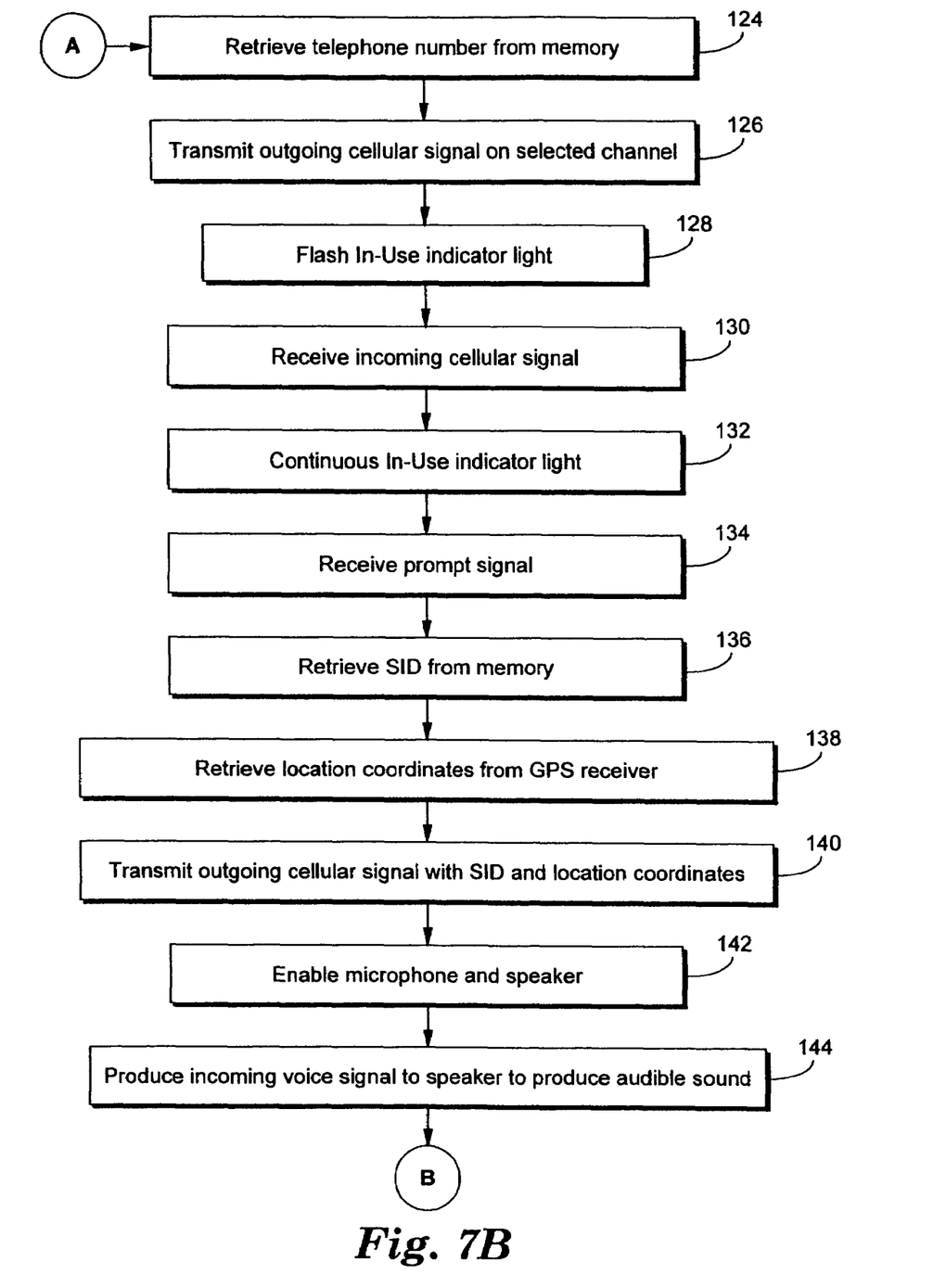

FIGS. 7A and 7B depict a flow diagram of a sequence of events that are set in motion when either the first or second activation button 20a or 20b is pressed to place an emergency call. The sequence of events is generally the same for when the phone 10 is activated by either button 20a or 20b. However, there are some differences, as described in the following discussion.

To gain access to the activation buttons 20a and 20b, the user first opens the protective cover 14 (step 100). With the cover 14 in the open position (as shown in FIGS. 1 and 3), the user presses the activation button 20a to place a call to a public emergency response service, or presses the activation button 20b to place a call to a private assistance service, such as the AAA. When pressing either button 20a or 20b, the user maintains pressure on the button 20a or 20b for at least a minimum period of time, such as one second (step 102). The user may then close the cover 14 (step 104) to prevent accidentally terminating the call, which could occur if the button 20a or 2b is inadvertently pressed again. Of course, the emergency phone 10 is also operable to complete the call if the cover 14 remains in the open position.

It is assumed for purposes of this description that the phone 10 is in a power-down mode prior to step 102. In other words, the cellular transmitter 68, the cellular receiver 62, and the microprocessor 46 are preferably drawing no power from the power supply 44. When the button 20a or 20b is pressed a first time and held for at least the minimum period of time, the phone 10 is powered up (step 106). Preferably, the microprocessor 46 powers-up and begins executing preprogrammed instructions before power is provided to the receiver 62 and transmitter 68.

Alternatively, the microprocessor 46, the receiver 62, and the transmitter 68 receive power simultaneously when the button 20a or 20b is pressed and held. In either case, when the microprocessor 46 is powered on, it proceeds to retrieve system operating parameters from the memory device 60 (step 108). These operating parameters preferably include an A/B preference parameter that indicates which cellular system, A or B, is preferred.

As one skilled in the art will appreciate, the A and B cellular systems each include twenty-one cellular channels, with the A system channels occupying one frequency range and the B system channels occupying another frequency range. As required by FCC rules, both of these systems are typically available in large metropolitan areas to provide competition between cellular service providers. In some geographical areas, only one of the systems may be available. If a conventional cellular phone is receiving cellular service from a service provider operating on the A system, that phone will prefer the A system over the B system, and will scan first for an available A system channel. If an A system channel is not available, the conventional phone will then scan for a B system channel. If a B system channel is available, the conventional phone will use the available B system channel in what is typically referred to as a "roaming" mode. When roaming, the A system-preferred user typically pays a higher cost per call to use a B system channel.

Since use of the emergency phone 10 to make a 911 call does not require a cellular service agreement with any cellular service provider, the phone 10 need not prefer either cellular system over the other when placing a 911 call. Thus, when the phone 10 is activated by pressing the first activation button 20a, the phone 10 may seek an available channel in either the A system or the B system.

Although current U.S. federal law requires that cellular service providers pass all 911 calls, some cellular providers still do not do so. If the cellular provider does not pass the 911 call, the caller typically receives a busy signal or a recorded message indicating that the call cannot be completed. To remedy this situation, in one embodiment, the phone 10 alternates which cellular system (A or B) on which it begins to dial for every other call. For example, if the first call is made on the A system and the caller receives a busy signal or recorded message, the caller may disconnect the call, press the 911 button 20 again, and the phone 10 makes the call on the B system.

With reference to FIG. 7A, after the microprocessor 46 has retrieved the system parameters from memory 60 (step 108), the receiver 62 of a preferred embodiment proceeds to scan first through B system channels (step 110) looking for a signal of sufficient strength to support a cellular call (step 112). The B system preference is determined by the A/B preference parameter recalled from memory at step 108. If no signal is found in the B system channels having a signal strength greater than a minimum threshold value, the receiver 62 then scans through the cellular A system channels (step 114). If no signal is found in the A system channels having a signal strength greater than the minimum threshold value, the low signal indicator light 22 is illuminated (step 116), and the receiver 62 starts scanning the B system channels again (step 110). This process continues until a signal of sufficient strength is found in the A or B system channels.

When an available channel having sufficient signal strength is found in either the B system channels (step 112) or the A system channels (step 118), the high signal indicator light 24 is illuminated (step 120). If more than one channel having a signal strength greater than the minimum threshold is found, the channel having the highest signal strength is selected for the call (step 122).

It should be appreciated that, depending on the preference parameter stored in the memory 60, the phone 10 could search for an available channel on the A system first, and then search in the B system if a signal of sufficient strength is not found in the A system. Thus, the A/B preference can be set at the time that the phone is manufactured by the selection of the value of the preference parameter stored in memory 60. As described in more detail below, this parameter may also be reprogrammed after the manufacture of the phone 10.

As shown in FIG. 7B, after channel selection, the microprocessor 46 retrieves from the memory device 60 the telephone number of the selected emergency response service (step 124). If the call was initiated by pressing the first activation button 20a, then the telephone number of the public emergency response service is retrieved at step 124. Preferably, the telephone number of the public emergency response service is "911", which is associated with all public emergency response centers in the United States. The telephone number stored in the memory 60 for the private emergency response service, such as the AAA, is preferably an eleven-digit 1-800 number that may be used throughout the United States.

When the telephone number of the public or private emergency response service has been retrieved from memory 60, the cellular transmitter 68 transmits an outgoing cellular signal on the selected cellular channel (step 126) and the in-use indicator light 26 begins flashing (step 128).

Note that all of the events that have occurred thus far in the calling process (steps 106-128) have been initiated by pressing a single one of the activation buttons 20a or 20b.

Thus, once powered-on, the microprocessor 46 executes its preprogrammed instructions to automatically scan for an available channel, retrieve the telephone number, and place the cellular call without any further action on the part of the user.

At this point, the selected emergency response service answers the call from the emergency phone 10 by transmitting a cellular signal referred to herein as an incoming cellular signal. As shown in FIG. 7B, the receiver 62 receives the incoming cellular signal (step 130), and the in-use indicator light 26 remains constantly on (step 132) to indicate to the user that communication with the emergency response service has been established.

In the preferred embodiment of the invention, once communication has been established, the emergency response service transmits and the decoder 79 receives the prompt signal (step 134). The microprocessor 46 then retrieves the SID from memory 60 (step 136) and retrieves the location coordinates from the internal GPS receiver 70 or an external GPS unit 74 (step 138). The transmitter 56 then transmits an outgoing cellular signal that includes the SID and location coordinates, such as in a digital data string (step 140). Preferably, the microphone 66 and the speaker 64 are then enabled (step 142).

Figure 7C:
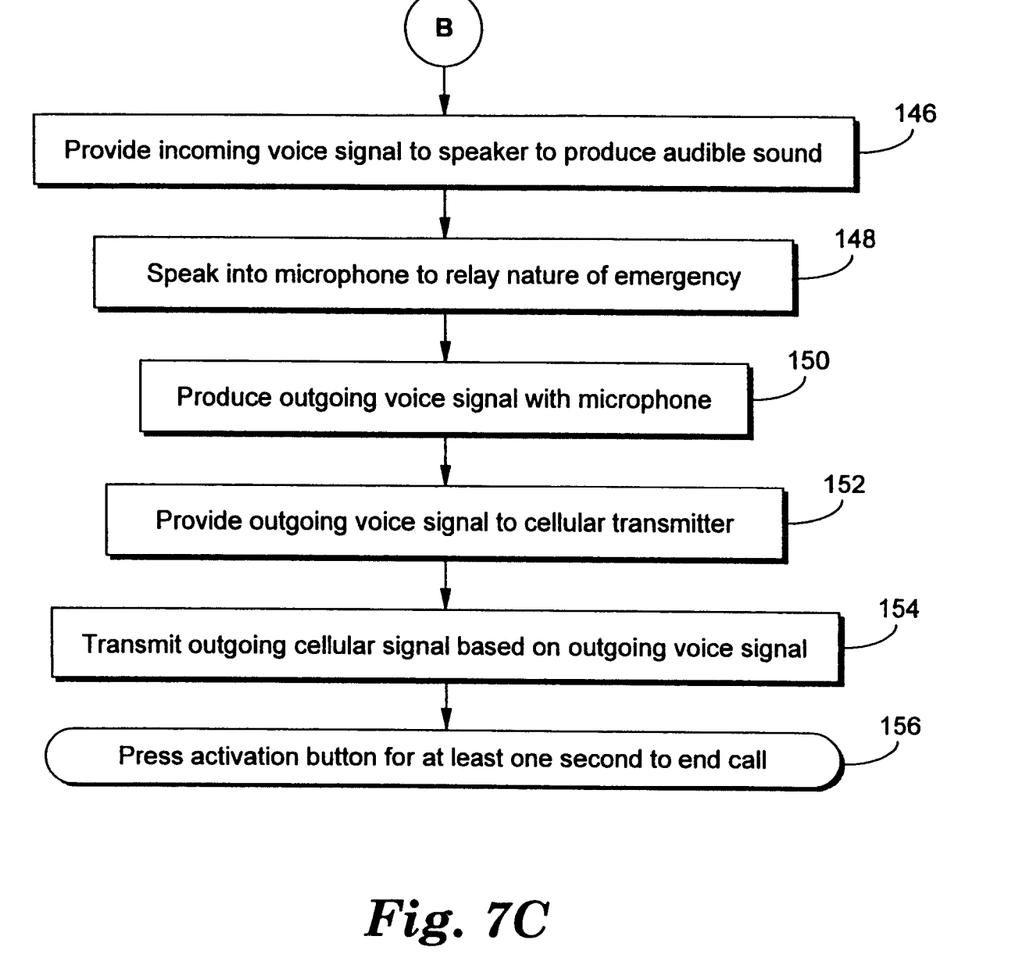

Based on the incoming cellular signal from the emergency response service, the receiver 62 produces an incoming voice signal (step 144), which is preferably an electrical audio signal. As shown in FIG. 7C, the incoming voice signal is provided to the speaker 64 to produce audible sound (step 146). Typically, the audible sound produced by the speaker at this juncture will be the voice of a person at the emergency response service inquiring as to the nature of the emergency.

With continued reference to FIG. 7C, the user of the emergency phone 10 speaks into the microphone port 34 to relay the nature of the emergency to the emergency response personnel (step 148). The microphone 66 receives the audible sound of the user's voice and produces an outgoing voice signal based thereon (step 150). The outgoing voice signal is provided to the cellular transmitter 68 (step 152), and the transmitter 68 transmits an outgoing cellular signal to the emergency response service based on the outgoing voice signal (step 154).

When the user wishes to terminate the call to the emergency response service, the user presses the button 20*a* or 20*b* (whichever one had been pressed to initiate the call) for a second time, and holds the button 20*a* or 20*b* for a minimum period of time, such as one second (step 156). When the microprocessor 46 determines that the button 20*a* or 20*b* is pressed and held while the phone 10 is powered up, the microprocessor 46 causes the phone 10 to power down. Requiring that the button 20*a* or 20*b* be held down for a minimum time prevents accidental termination of the emergency call due to an inadvertent pressing of one of the buttons 20*a* or 20*b*.

Thus, as indicated by the flow chart of FIGS. 7A-C, all of the steps involved in making an emergency telephone call to an emergency response service are accomplished by a single press of one activation button 20*a* or 20*b* on the emergency phone 10. This makes it much simpler for a person who is distracted by a stressful situation, or who may be in some way incapacitated, to place an emergency call.

By comparison, using a conventional cellular phone to place a call to a 911 emergency response service requires that a user press at least four separate control buttons: the power button once, the "9" button once, the "1" button twice, and the "SEND" button (or equivalent) once. Calling a 1-800 number to a private service such as the AAA further requires pressing the additional digits in the phone number. To end a call and power-down a conventional cellular phone, the user must typically press the "END" button (or equivalent) once, and then the power button once. Thus, establishing and ending a 911 emergency call using a conventional cellular phone requires at least seven presses of five different buttons. Only two presses of a single activation button 20*a* are required with the emergency phone 10 of the present invention.

With reference to FIG. 6, the interface port 38, such as an RS232 interface, allows the processor 46 of the emergency phone 10 to communicate with an external device. In one embodiment of the invention, the external device is a geographical locating device, such as an external GPS unit 74. In this embodiment, the GPS unit 74 provides positional coordinate data to the phone 10 by way of the interface port 38. This positional data may then be transmitted to the public or private emergency response service to give the emergency response personnel an exact position of the phone 10. Preferably, the GPS unit 74 is in a relatively small modular housing which may be removably connected to the phone housing 12, such as by a latching mechanism. The modular housing of the GPS unit 74 includes an interface connector that mates with the interface port 38 when the housing of the GPS unit 74 is connected to the phone housing 12. Alternatively, the GPS unit 74 may communicate with the interface port 38 by way of an interface cable.

As shown in FIG. 6, the GPS unit 74 preferably includes a modular mapping card 76. The mapping card 76 is a memory device which correlates latitude/longitude coordinates, as typically provided by a GPS system, to X-Y (rectangular) coordinates in feet or miles. Preferably, the X-Y coordinates provided by the mapping card 76 are relative to some local landmark. In this manner, the positional data that the phone 10 transmits to the emergency response service may be more easily used by emergency response personnel in mapping the exact position of the emergency phone 10.

Figure 8:
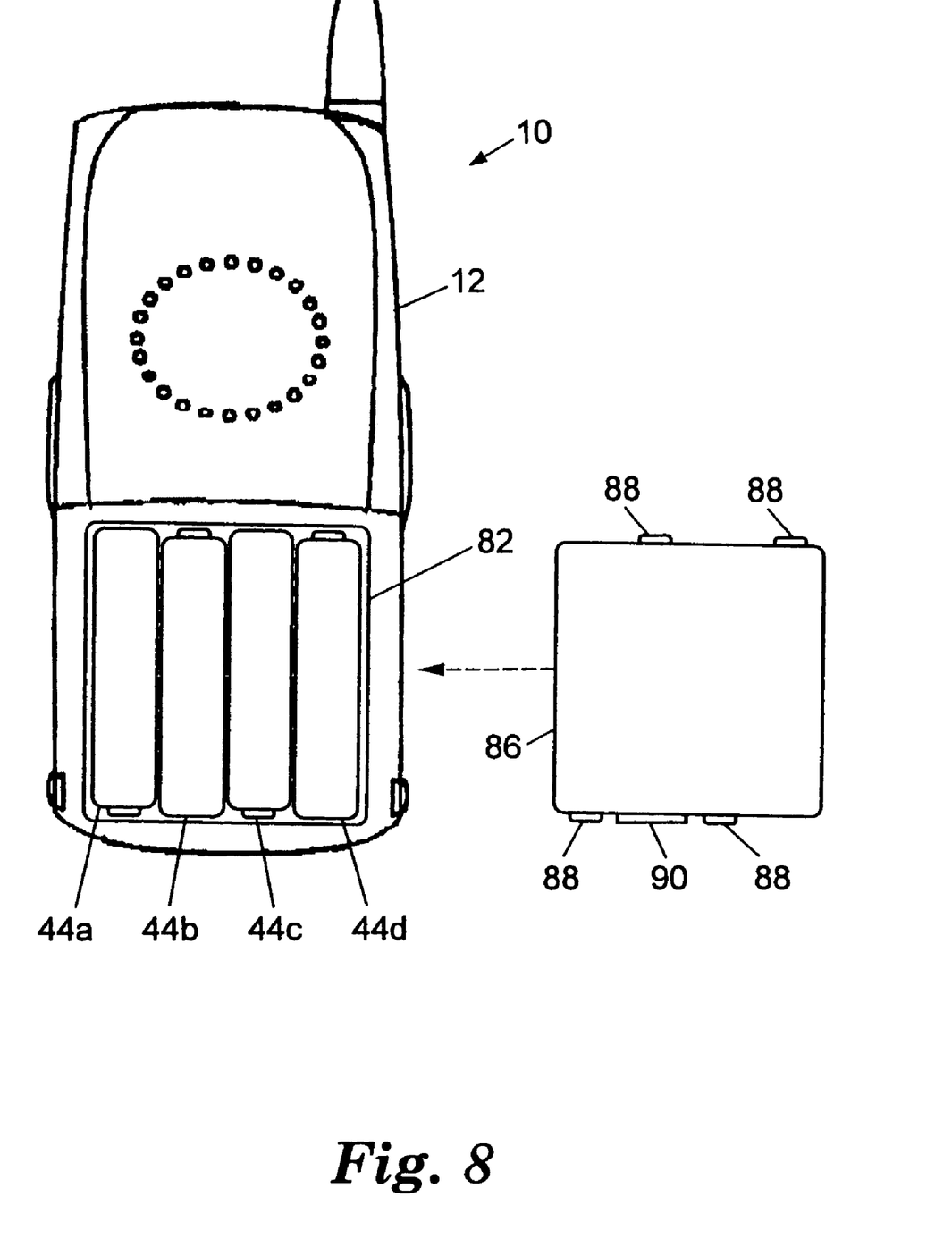
FIG. 8 depicts a bottom view of the emergency phone with a battery compartment revealed according to a preferred embodiment of the invention.

As depicted in FIG. 8, in one embodiment of the invention, the standard batteries 44*a*-44*d* may be replaced by a GPS/battery pack module 86. In this embodiment, GPS/battery pack module 86 includes the GPS unit 74 integrated with a custom lithium, nickel-cadmium, or alkaline battery pack that powers the phone 10 and the GPS unit 74. When snapped into place on the phone housing 12, power contacts on the GPS/battery pack module 86 engage corresponding battery contacts 88 in the battery compartment 82, and an interface connector 90 on the module 86 make connection with the interface port 38 on the phone housing 12.

The interface port 38 is also useful in providing access to the microprocessor 46 and memory 60 for programming purposes. For example, the interface port 38 may be used to change or update the outgoing emergency telephone numbers stored in the memory 60. This function is especially important since there is no keypad such as is typically used on conventional cellular phones for reprogramming purposes. As shown in FIG. 8, a phone number programming unit 78, such as a palm-top or lap-top computer, may be connected to the interface port 38 to provide commands to the processor 46 to store the outgoing telephone numbers to the memory 60.

One skilled in the art will appreciate the interface port 38 may also be used to update the software instructions that are executed by the processor 46 when either of the activation buttons 20*a* or 20*b* are pressed. For example, the sequence of A/B cellular system scanning as described above could be updated to take advantage of future changes in cellular service provider procedures or future FCC rulings that may affect how 911 calls are handled by service providers. Also, system parameters that are stored in the memory 60 may be updated by way of the interface port 38. For example, the A/B system preference parameter may be changed to prefer the A system channels over the B system channels, such that the A system channels are scanned first. This latter change may be required when the contracted cellular service used to contact the private emergency response service is switched from one cellular service provider to another.

As shown in FIG. 4, the preferred embodiment of the invention includes a battery compartment cover 80 which snaps securely into place on the housing 12. Removal of the battery compartment cover 80 reveals the battery compartment 82 as shown in FIG. 8. Within the battery compartment 82 are preferably four batteries 44a, 44b, 44c, and 44d, such as AAA alkaline batteries, which comprise the power supply 44 (see FIG. 6). In addition to the advantages discussed previously, these types of batteries are preferred to power the emergency phone 10 because they are so easy to find for purchase at most department stores, hardware stores, grocery stores, and convenience stores. In contrast, consider that conventional cellular phones require custom-sized battery packs that are typically compatible only with one model of phone. Replacement battery packs for conventional cellular phones typically may only be found at specialty stores, such as phone accessory stores or electronic supply stores. Thus, because of the relative ease in finding replacement batteries, the emergency phone 10 offers yet another significant advantage over conventional cellular phones.

The design of the battery compartment 82 and the battery compartment cover 80 of the emergency phone 10 also makes the emergency phone 10 more rugged than the conventional cellular phone. In most conventional cellular phones, the battery packs constitute a significant portion of the phone housing. Usually, the conventional cellular phone battery pack is integrated into a single modular unit which may be snapped into place to form a portion of the phone housing. If the conventional phone is dropped or hit, the conventional battery pack is susceptible to being dislodged from the phone housing. If this were to occur during an emergency call, communication with the emergency response center would be lost.

In contrast, the preferred embodiment of the emergency phone 10 is significantly less susceptible to battery failure, even if the phone 10 is dropped or jarred. First, the battery compartment cover 80 provides protection for the batteries 44a-44d held within the compartment 82. Further, since the batteries 44a-44d are separate from the cover 80, an impact which may dislodge the cover 80 would not necessarily dislodge the batteries 44a-44d. Thus, the emergency phone 10 could remain operational even if the battery compartment cover 80 comes off.

Figure 9:
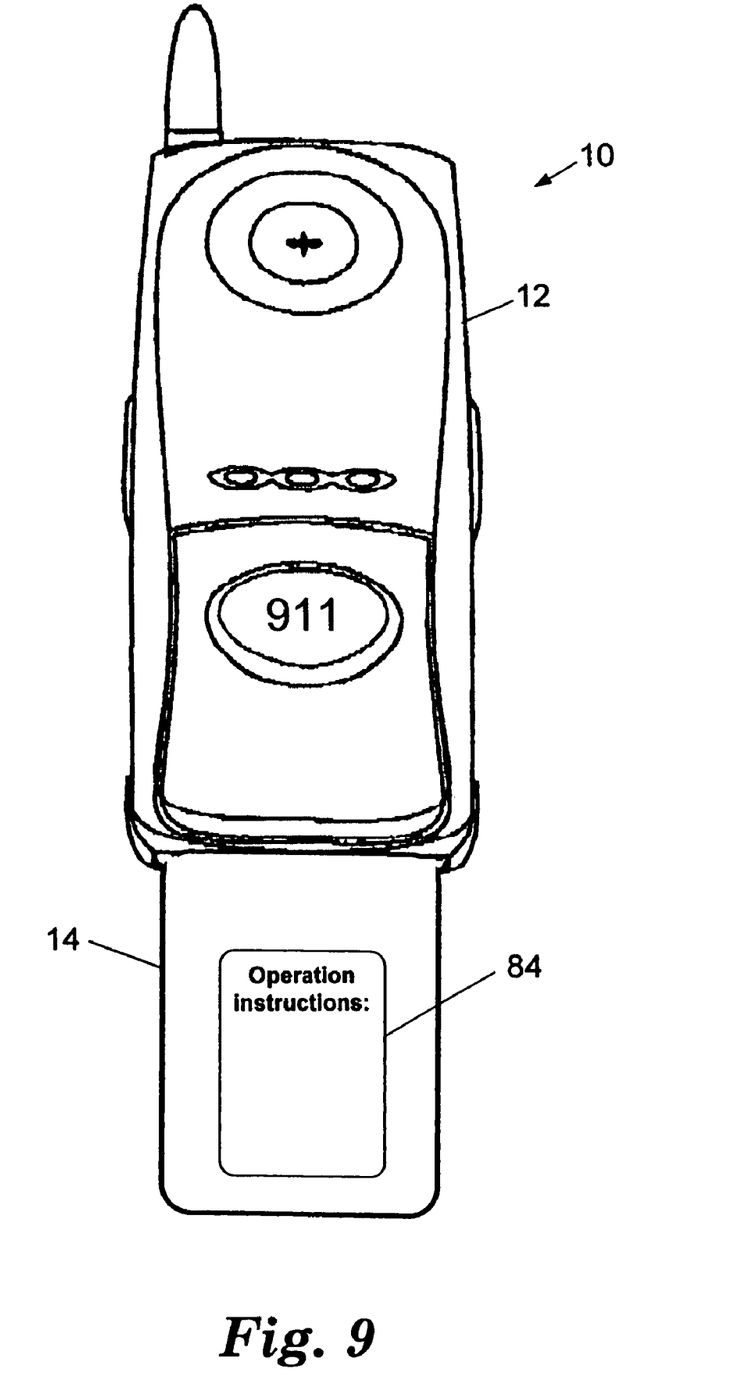
FIG. 9 depicts a top view of the emergency phone with the protective cover in an open position according to a preferred embodiment of the invention.

FIG. 9 illustrates yet another advantageous feature of the emergency phone 10. When the protective cover 14 is in the open position, operation instructions 84 are visible to the user on the inside surface of the cover 14. Preferably, these operation instructions 84 include written and illustrated instructions on how to use the phone 10 to place a call to the public or private emergency response service, and how to activate the audible alarm 48. These instructions 84 may be screen printed directly onto the inside surface of the plastic cover 14, or are preferably printed on a stick-on label which is applied to the inside surface of the cover 14.

Of course, since only one button 20a or 20b is used to activate the phone and place a call, the instructions 84 are simple and straightforward. However, the first time that a user actually needs to use the phone 10 may be in the midst of a stressful, confusing, or dangerous situation. In such a situation, having the operating instructions 84 provided inside the cover 14 could save valuable time. Also, since the emergency phone 10 is intended for emergency use only, considerable time may pass between uses. Because the phone 10 may not be used very often, even though the user may have used the phone 10 before, the user may forget how it operates when the user is in a stressful situation. Thus, the operation instructions 84 provide a handy and quick reminder.

While the invention has been described in detail, it is to be expressly understood that it will be apparent to persons skilled in the relevant art that the invention may be modified without departing from the spirit of the invention. Various changes of form, design or arrangement may be made to the invention without departing from the spirit and scope of the invention. Therefore, the above mentioned description is to be considered exemplary, rather than limiting, and the true scope of the invention is that defined in the following claims.

What is claimed is:

1. A communication apparatus comprising:
    a housing;
    a single button accessible through the housing;
    a speaker disposed within the housing;
    a microphone disposed within the housing; and
    a cellular transceiver disposed within the housing and electrically connected to the single button, the speaker, and the microphone, wherein the cellular transceiver, the speaker, and the microphone are adapted to allow voice communications between an operator of the apparatus and a response center when the single button is pressed for a predetermined minimum amount of time, and wherein a contact number associated with a secondary response center is called when the communication apparatus is unable to establish a call with a primary response center.

2. The communication apparatus of claim 1 wherein the single button, when pressed, provides power from a power supply in the apparatus to the cellular transceiver, activates the cellular transceiver to search for an available cellular system channel, and transmit an outgoing cellular signal.

3. The communication apparatus of claim 1 further comprising a microprocessor for controlling the communication apparatus based on execution of a set of operational instructions, wherein the single button causes activation of the microprocessor.

4. The communication apparatus of claim 3 wherein upon application of power from the power supply, the cellular receiver scans for a strongest cellular signal from among available cellular system channels based on the set of operational instructions executed by the microprocessor.

5. The communication apparatus of claim 4 further comprising a signal indicator, wherein the microprocessor is operable to provide an indication of the signal strength of the strongest signal when power is applied to the communications apparatus by the power supply.

6. The communication apparatus of claim 5 wherein the signal indicator includes a low signal light and a high signal light.

7. The communication apparatus of claim 3 wherein the contact number associated with the secondary response center is stored in the communication apparatus, and wherein the microprocessor uses the contact number to place a call using the cellular transceiver to attempt to establish cellular communication with the response center.

8. The communication apparatus of claim 7 wherein the microprocessor determines whether cellular communication with the response center has been successfully established, and, if cellular communication with the response center has not been successfully established, waiting a predetermined period and then activating the cellular transmitter to again attempt to establish cellular communication with the response center.

9. The communication apparatus of claim 3 further comprising an interface port electrically connected to the microprocessor and accessible through the housing, wherein the microprocessor is operable to exchange signals with an external device via the interface port.

10. The communications apparatus of claim 1 further comprising a test button in the housing, the test button operable to call a 911 center.

11. The communication apparatus of claim 1 further comprising a location detection circuit operable to respond location signals indicating a physical location of the communications apparatus.

12. The communication apparatus of claim 11 wherein the location detection circuit comprises a Global Positioning Satellite system receiver.

13. A communication apparatus comprising:
a housing;
a button accessible through the housing;
a speaker;
a microphone;
a location detection circuit disposed in the housing and operable to provide a signal indicative of the location of the communications apparatus;
a cellular transceiver disposed within the housing;
wherein the buttons when pressed, is operable to activate the cellular transceiver to allow an operator of the apparatus to maintain a voice conversation with response center personnel using the speaker and the microphone.

14. The communication apparatus of claim 13 wherein the location detection circuit comprises a Global Positioning Satellite system receiver.

15. The communication apparatus of claim 13 wherein the button, when pressed, calls a primary contact number associated with a primary response center.

16. The communications apparatus of claim 15 wherein a secondary contact number is called when the communication apparatus is unable to establish a call using the primary contact number.

17. The communication apparatus of claim 13 further comprising an interface port electrically connected to a microprocessor and accessible through the housing, wherein the microprocessor is operable to exchange signals with an external device via the interface port.

18. The communications apparatus of claim 13 further comprising a test button in the housing, the test button operable to call a 911 center.

19. The communication apparatus of claim 13 further comprising a microprocessor for controlling the communication apparatus based on execution of a set of operational instructions, wherein the button when pressed causes activation of the microprocessor to begin executing the set of operational instructions.

* * * * *

UNITED STATES PATENT AND TRADEMARK OFFICE
CERTIFICATE OF CORRECTION

| | |
|---|---|
| PATENT NO. | : 7,251,471 B2 |
| APPLICATION NO. | : 11/174191 |
| DATED | : July 31, 2007 |
| INVENTOR(S) | : Brian M. Boling et al. |

It is certified that error appears in the above-identified patent and that said Letters Patent is hereby corrected as shown below:

In the claims:

Column 16, Line 1, delete "buttons" and replace with --button--.

Signed and Sealed this

Second Day of October, 2007

JON W. DUDAS
*Director of the United States Patent and Trademark Office*